(12) United States Patent
Barker et al.

(10) Patent No.: US 11,448,459 B1
(45) Date of Patent: Sep. 20, 2022

(54) CRYOGENIC GAS SEPARATOR

(71) Applicant: The Tisdale Group, LLC, Lebanon, TN (US)

(72) Inventors: Donald Wade Barker, Lebanon, TN (US); Matthew Baldwin, Antioch, TN (US); Gregory Wyatt Mabry, Chattanooga, TN (US)

(73) Assignee: The Tisdale Group, LLC, White House, TN (US)

( * ) Notice: Subject to any disclaimer, the term of this patent is extended or adjusted under 35 U.S.C. 154(b) by 0 days.

(21) Appl. No.: 17/451,375

(22) Filed: Oct. 19, 2021

Related U.S. Application Data

(60) Provisional application No. 63/225,227, filed on Jul. 23, 2021.

(51) Int. Cl.
*F25J 3/02* (2006.01)
*F25B 9/14* (2006.01)

(52) U.S. Cl.
CPC ............... *F25J 3/0233* (2013.01); *F25B 9/14* (2013.01); *F25J 3/0209* (2013.01); *F25J 2200/06* (2013.01)

(58) Field of Classification Search
CPC ........ F25J 3/0209; F25J 3/0233; F25J 1/0022; F25J 2200/64; F25J 2270/912; F25J 2270/91; F25J 2270/908; F25J 2260/64; F25B 9/14
See application file for complete search history.

(56) References Cited

U.S. PATENT DOCUMENTS

| | | | |
|---|---|---|---|
| 2006/0026988 A1* | 2/2006 | Unger | F25J 3/04278 62/643 |
| 2010/0147022 A1* | 6/2010 | Hart | F25J 3/0242 62/601 |
| 2019/0226745 A1 | 7/2019 | Barker | |
| 2019/0226754 A1* | 7/2019 | Lindel | F25D 23/10 |

* cited by examiner

*Primary Examiner* — Brian M King
(74) *Attorney, Agent, or Firm* — United IP Counselors, LLC

(57) ABSTRACT

Contaminants are removed from a raw natural gas stream and other types of mixed-gas streams by a separation system. The system is based on using a series of cryogenic cells, devices that can impose essentially any desired temperature and pressure conditions on a volume of incoming gas, down to cryogenic temperatures and up to multiple atmospheres of pressure. Used in succession at specific setpoints of temperature and pressure, the cryogenic cells cause gaseous contaminants in the raw gas stream to condense into liquid form, at which point, they can be separated from the stream. Flowmeters and component detectors, like mass spectrometers, are used to detect the state of the gas stream at various points in the system. The system may be divided into stages, each stage having cryogenic cells operating at different setpoints of temperature and pressure, in order to cause different contaminants to liquefy for separation.

25 Claims, 4 Drawing Sheets

CRYOGENIC GAS SEPARATOR

CROSS-REFERENCE TO RELATED APPLICATIONS

This application claims priority to, and the benefit of, U.S. Provisional Patent Application No. 63/225,227, filed Jul. 23, 2021, the contents of which are incorporated by reference herein in their entirety.

TECHNICAL FIELD

The invention relates to gas separation systems, and in particular, to cryogenic gas separation systems.

BACKGROUND

Raw natural gas streams include methane as well as other gases, including carbon dioxide, water vapor, nitrogen, and other hydrocarbons. These other gases are contaminants. For example, certain gases, like carbon dioxide, can form acids in the presence of water, causing corrosion in pipelines and other infrastructure. These impurities must be removed for the gas to be useful. For example, carbon dioxide may be 40-50% by volume in a raw natural gas stream but is permitted in amounts of no greater than 2-4% in a useable natural gas stream, depending on local regulations. Additionally, raw natural gas streams often include other hydrocarbons, like ethane, propane, butane, pentane, and hexane, that are useful in other contexts but are not found in commercial natural gas. These other hydrocarbons are typically removed as well.

Removing impurities from a raw natural gas stream is an energy-intensive process often requiring a large processing plant. That plant is usually some distance from the natural gas well or wells.

BRIEF SUMMARY

One aspect of the invention relates to a system for removing contaminants from a raw natural gas stream and other types of mixed-gas streams. The system is based on using a series of cryogenic cells. The cryogenic cells are devices that can impose essentially any desired temperature and pressure conditions on a volume of incoming gas, down to cryogenic temperatures and up to multiple atmospheres of pressure. Used in succession at specific setpoints of temperature and pressure, the cryogenic cells cause gaseous contaminants in the raw gas stream to condense into liquid form, at which point, they can be separated from the stream. Flowmeters and component detectors, like mass spectrometers, are used to detect the state of the gas stream at various points in the system.

The system may be divided into stages. In a first stage, the gas stream may be passed repeatedly through a cryogenic cell or a set of cryogenic cells and a separator to remove a major contaminant like carbon dioxide. The level of the major contaminant in the stream may be measured by a detector, and the stream may be released from the first stage only when it meets certain criteria, such as a level of the major contaminant that is below a defined threshold. The setpoints of the cryogenic cells may be such that other contaminants are liquefied and removed along with the major contaminant. When appropriate, the stream of gas is released into a second stage, which focuses on using another cryogenic cell or set of cryogenic cells to liquefy the major desired constituent of the stream, such as methane. In some cases, a working system may be deployed in a transport container, such as an intermodal transport container, for placement at a natural gas field near natural gas wells.

As one example, a system according to this aspect of the invention may include three stages. The first stage is adapted to remove carbon dioxide from an incoming raw gas stream, and uses a number of cryogenic cells, arranged in series or in parallel, with a temperature setpoint that causes carbon dioxide to liquefy. The second stage is adapted to remove hydrocarbons other than methane from the gas stream, and uses a number of cryogenic cells, arranged in series or parallel, with a temperature setpoint that causes those contaminants to liquefy. The third stage is adapted to liquefy the methane itself, and has cryogenic cells with a temperature setpoint designed to do so. Remaining atmospheric gases, like nitrogen and oxygen, may be vented to atmosphere.

Other aspects, features, and advantages of the invention will be set forth in the following description.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
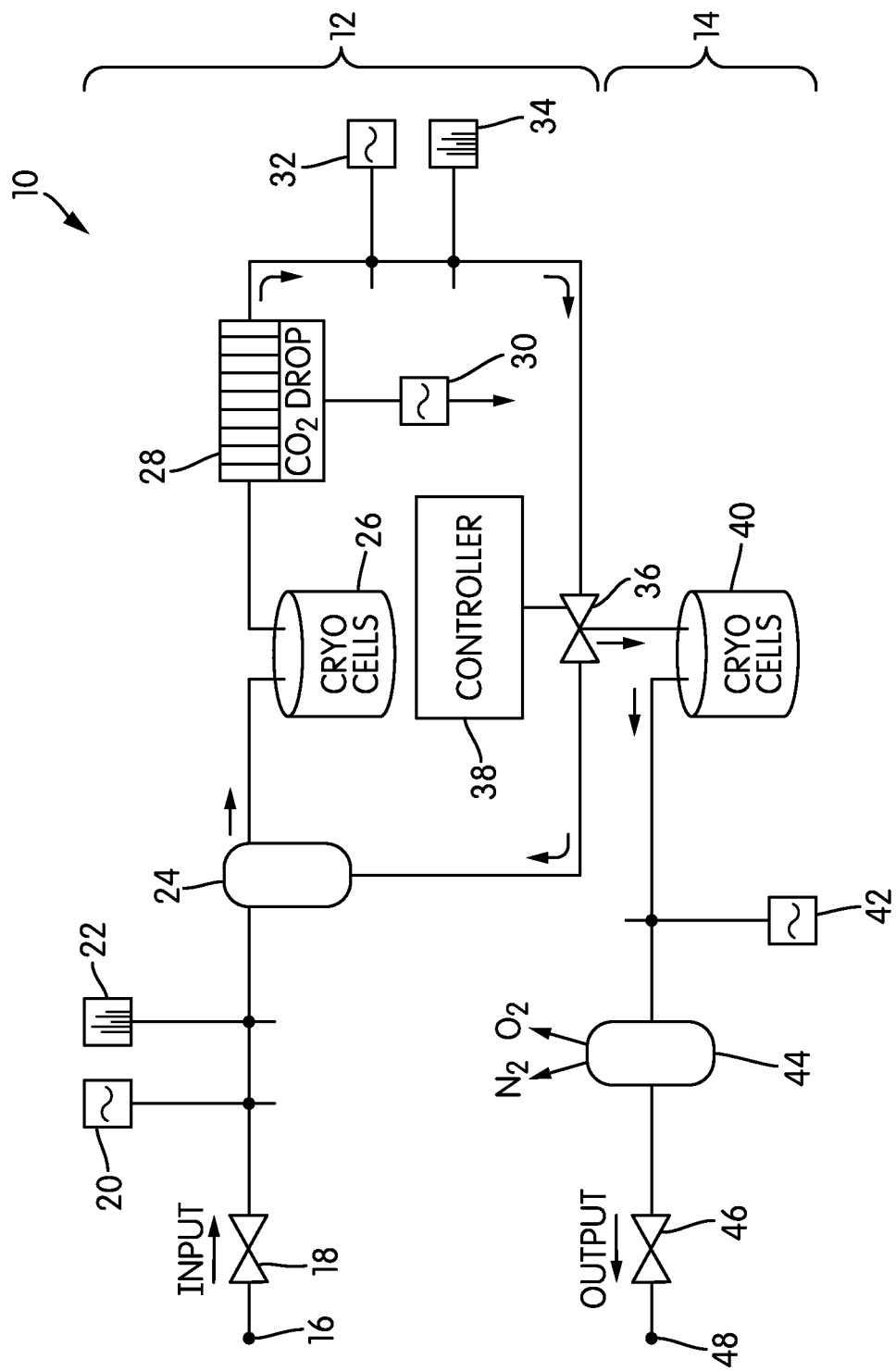
FIG. 1 is a schematic diagram of a gas separation and purification system according to one embodiment of the invention.

FIG. 1 is a schematic diagram of a gas separation and purification system, generally indicated at 10, according to one embodiment of the invention. As illustrated in FIG. 1, system 10 has two stages, a first stage 12, and a second stage 14. In the first stage 12, gross contaminants are removed from an incoming gas stream. In the second stage 12, the remaining gas is brought to predefined conditions of temperature and pressure for storage and transport. Although system 10 can be used to perform separations and purifications on a wide variety of gas streams, the remainder of this description will assume that the incoming gas stream is a raw natural gas stream. The raw natural gas stream referenced in this description may come from a variety of sources, including landfills, wells, biogas processing plants, etc.

In the first stage 12, an input port 16 is provided with a valve 18 to control entry of the gas stream into system 10. The input port 16 may have whatever characteristics are necessary to receive a raw gas stream, and may be made of a material that does not react with the incoming gas stream, e.g., stainless steel. The incoming gas stream may be at a wide range of pressures, e.g., 1-300 psi (up to 2.1 MPa), and a wide range of temperatures, e.g. 0-200° F. (−18° C. to 93° C.). A flow meter 20 and a composition detector 22 measure the flow of the incoming gas and the composition of the incoming gas, respectively, before the gas stream enters a manifold 24. The composition detector 22 may be any instrument that is suitable for the application. In one embodiment, the composition detector 22 may be a mass spectrometer that is capable of distinguishing between various gases, including, for example, hydrogen, helium, carbon dioxide, methane, and other such gases commonly found in a raw natural gas stream.

From the manifold, the raw gas stream enters one or more cryogenic cells 26. As will be described below in more detail, a cryogenic cell 26 is a device that allows one to control the temperature, pressure, and flow rate of the incoming gas stream. The cell 26 is referred to here as "cryogenic" because it uses cryogens in its internal operations and allows the gas stream to be cooled to any desired temperature down to cryogenic temperatures, at any desired working pressure. Most commonly, the cryogenic cell 26 will use liquid nitrogen internally to absorb heat, making it capable of cooling the gas stream down to nearly the temperature of liquid nitrogen, if needed. The cryogenic cell 26 may be able to operate at pressures up to, e.g., 750 psi (5.2 MPa).

As was described above, any incoming gas stream is expected to be a mixture of different gases, some desirable and some not. In natural gas, methane is desirable; carbon dioxide, water vapor, nitrogen, oxygen, and other hydrocarbons are not. System 10 uses a series of cryogenic cells 26, or a series of sets of cryogenic cells 26, to cause unwanted gases to liquefy. Once liquefied, unwanted gases can be easily separated from the stream.

In the first stage 12 of system 10, the focus is on separating out the major contaminant or contaminants. Because a raw natural gas stream may include up to 60% carbon dioxide, in this particular embodiment, carbon dioxide is assumed to be the focus of the first stage 12.

Although one cryogenic cell 26 is shown in FIG. 1 for ease of illustration, the number of cryogenic cells 26 that may be used in any stage 12, 14 of system 10 is not limited, and depends primarily on factors like the volume of the incoming gas stream. For example, two, four, six, eight, ten or more cryogenic cells 26 may be used in series and in parallel to remove a component like carbon dioxide from the gas stream. With respect to the illustration of FIG. 1, the gas stream passes through an initial cryogenic cell 26 or set of cryogenic cells 26 that are set to a temperature and pressure that cause carbon dioxide to liquefy. The set point of the cryogenic cells 26 may cause other unwanted gases with similar phase diagrams and characteristics to liquefy as well. This part of the process may be done in a continuous-feed fashion by flowing the gas through the cryogenic cells 26 continuously, or it may be done in batches. In a batch implementation, a portion of the gas stream may enter each cryogenic cell 26 and remain there for a period of time, e.g., 1-2 minutes. The increased dwell time within the cryogenic cells 26 will increase heat transfer between the gas and the cell 26. Whether the incoming gas stream is fed in continuously or in batches with defined dwell times may depend, at least in part, on the temperature of the incoming raw gas stream.

When the gas leaves the cryogenic cell or cells 26, at least some of the material in the stream has liquefied. The stream flows through a drop-off separator 28, where the liquefied components are separated from the still-gaseous portion of the stream. This may be done in any number of ways. The liquid components separated by the separator 28 are exhausted through a flowmeter 30.

In this description, whenever a component of the gas steam is described as being "exhausted," that term means that the component may be dealt with in any appropriate way. In some cases, if the gas is a component of atmosphere, like oxygen or nitrogen, it may be released to atmosphere. In other cases, the gas may be stored or reacted with other compounds to sequester it in a stable form. A component that is in liquid phase when it is exhausted may be allowed to transition to gaseous phase, it may be maintained in liquid phase, or it may be converted to solid phase downstream of the exhaust. In the end, once a separated component leaves the gas stream, its disposition is at the discretion of the operator of system 10.

The first stage 12 of system 10 operates under the assumption that it could require more than one pass to remove all of an unwanted component of the gas stream, like carbon dioxide. Thus, once the liquified carbon dioxide is exhausted at the drop-off separator 28, the remaining flow is measured by a flowmeter 32 and its constituents checked by a detection device 34, which may again be a mass spectrometer. The flowmeter 32 and detection device 34 may be essentially identical to the flowmeter 20 and detection device 22 used earlier in the first stage 12 of system 10, or they may be different, e.g., set to different detection limits, or adapted to detect different components.

Ultimately, after the separator 28, flowmeter 32, and detection device 34, the first stage 12 of system 10 includes a three-way valve 36 controlled by a controller 38. The controller 38 takes input from the flowmeter and the detection device 34. If the stream has the characteristics necessary to be released from the first stage 12 into the second stage 14 of system 10, the controller 38 actuates the valve 36 to send the stream into the second stage 14. If not, the stream is returned to the manifold 24 and makes another pass through the cryogenic cells 26 and separator 28.

The primary determinant of whether or not the stream is ready to be released from the first stage 14 is whether or not the contaminant that was to be removed has been removed to within predetermined tolerances. For example, with carbon dioxide, the controller 38 may use input from the detection device 34 to determine whether the carbon dioxide remaining in the stream is the 2-4% or less permitted in most pipeline applications. However, any defined threshold may be used. Particularly if the raw natural gas stream comes into system 10 hot, it may require more than one pass through the first stage 12 to bring it to an appropriate temperature at which carbon dioxide and other unwanted contaminants will liquefy.

The volume of the stream, the pressure of the stream, and other factors may play a role in determining when the stream is released from the first stage 12. For example, because carbon dioxide is typically a high percentage of the raw gas stream, its separation will cause the stream to lose a good deal of its volume. Raw gas may be added to the first stage 12 from the manifold 24 while some gas is cycled through the first stage 12 repeatedly until the volume, pressure, flow rate, and other characteristics of the stream are as desired for release from the first stage 12.

Once the valve 36 is actuated, the gas stream flows into another set of cryogenic cells 40. This set of cryogenic cells 40 may have the same basic characteristics as the cryogenic cells 26 of the first stage 12 but will generally be set to different temperature and pressure setpoints. In contrast to the first stage 12, the focus of the second stage 14 in this embodiment is the liquefaction of the remaining stream, which is presumed to be useable natural gas, so that it can be inserted into a pipeline or otherwise conveniently transported. For this reason, the setpoint temperatures and pressures of the second set of cryogenic cells 40 may be a temperature and a pressure needed to liquefy methane.

From the cryogenic cell or cells 40, the stream flows through a flowmeter 42, and then to a manifold 44. By the time the stream reaches the manifold 44, it is expected to be predominantly liquefied natural gas. However, other components will likely still be present. For example, oxygen and nitrogen will generally not be liquefied by the conditions within the cryogenic cells 26, 40. Thus, the manifold 44 may be equipped with a vent stack to exhaust gases like nitrogen and oxygen. A valve 46 controls access to the output port 48.

The output stream is usually liquefied natural gas, although it may be heated or expanded back into gaseous form for some applications. Once released from the second stage 14 of system 10, the liquefied natural gas may be placed directly in a pipeline for transport, or may be placed in, e.g., transport trucks.

Figure 2:
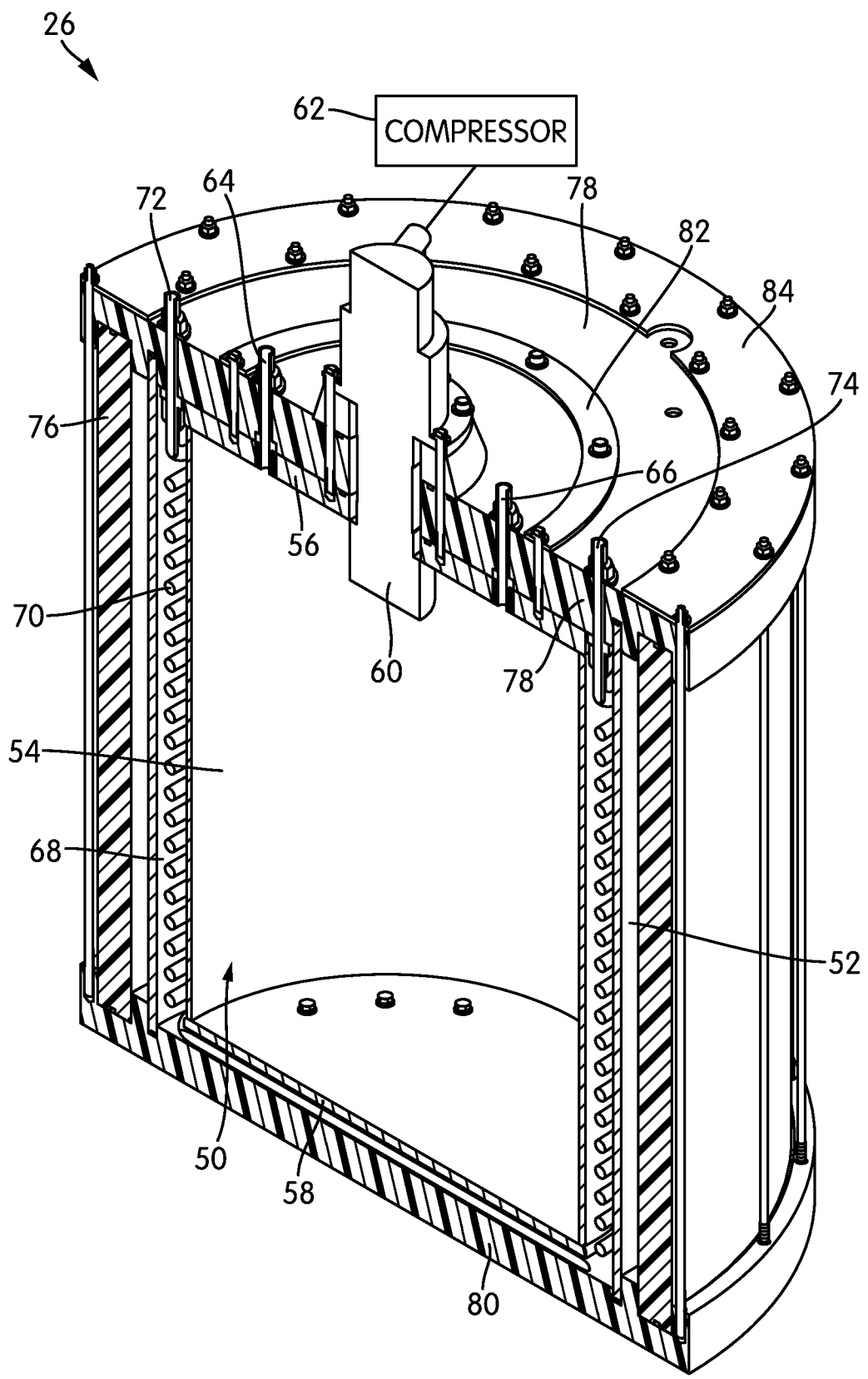
FIG. 2 is a partially sectional perspective view illustrating the structure of a cryogenic cell that is used in the system of FIG. 1.

The description above presents a brief description of the cryogenic cells 26, 40 that form the core of system 10. FIG. 2 is a partially sectional perspective view of the cryogenic cell 26, illustrating its structure. The cryogenic cell 26 has an inner vessel 50 and an outer vessel or shroud 52. In the illustrated embodiment, the inner vessel 50 has a tubular sidewall 54, a circular top 56, and a circular bottom 58, although other shapes are possible.

The components 54, 56, 58 of the inner vessel 50 are made such that the inner vessel 50 is capable of containing the working pressures of a cryogen held within. It is helpful if the walls of the inner vessel 50 also have some degree of thermal conductivity. For these reasons, the components of the inner vessel 50 may be made of a metal, such as aluminum, copper, or stainless steel. For example, 6061 T6 aluminum may be used for its relatively high thermal conductivity and sufficient rigidity. The inner vessel 50 may be designed to operate at pressures of up to, e.g., 400 psi, and the thicknesses of the components 54, 56, 58 may be selected appropriately by taking the operating pressure into consideration.

A first cryogen is held within the inner vessel 50. Typically, that first cryogen would be liquid nitrogen, although other cryogens may be used. The first cryogen is kept in liquid phase and under cryogenic conditions by a cold head 60 supplied with a second cryogen that is colder than the first cryogen. The second cryogen may, e.g., be liquid helium, although liquid hydrogen, liquid argon, and other, more exotic cryogens may also be used. Because of the cold head 60, any of the first cryogen that heats or expands into gas phase is caused to condense back into liquid phase. The cold head 60 is connected to a self-contained compressor 62 (shown in FIG. 2) that compresses the second cryogen back into liquid form after it is heated. An input port 64 is provided in the inner vessel 50 that allows it to be filled with the first cryogen. An output port 66 is also provided. In some cases, the output port 66 may be used as a drain; however, the output port 66 would typically be equipped with a pressure relief valve set to release pressure within the inner vessel 50 if the pressure grows beyond a defined threshold, e.g., 300-400 psi.

While the cold head 60 keeps the first cryogen in liquid state, as will be described below, there is heat transfer into and out of the inner vessel 50. For that reason, the cold head 60 may actually drive the first cryogen to a lower temperature than required to keep it in liquid form.

The outer vessel or shroud 52 surrounds the sidewall 54 of the inner vessel 50, creating a space 68 between the sidewall 54 of the inner vessel 50 and the shroud 52. The shroud 52 is a structural component, capable of containing pressure. For example, the shroud 52 may also be made of a metal, such as aluminum. In the space 68 between the inner vessel 50 and the shroud 52, a set of tubes or coils 70 are provided. The coils 70 are positioned in the middle of the space 68; they do not directly contact the outer surface of the sidewall 54 in this embodiment.

In U.S. Patent Application Publication No. 2019/0226745, a comparable space between the walls of a double-walled vessel is filled with an aerogel. By contrast, the space 68 is devoid of an insulating material. Instead, in order to vary the heat transfer between the inner vessel 50 and the coils 70, a compressible fluid is pumped into the space 68. The compressible fluid may be, e.g., air, nitrogen, or some other gas. If very little heat transfer is required, the space 68 may be pumped down to a vacuum or near-vacuum. For example, pressures as low as 10 Torr may be used. However, if more heat transfer is desired, the compressible fluid may be pumped into the space 68 to a greater pressure. As those of skill in the art will realize, the more mass of compressible fluid that is present, the greater the heat transfer that will occur between the inner vessel 50 and the coils 70 in the space 68.

If desired, fans or other circulating devices may be added to the space 68 to increase convection within the space 68. For example, slow speed fans that circulate the compressible fluid at relatively slow speeds, e.g., 3CFM, may be helpful in some embodiments to increase convection, and thus, heat transfer. If circulating devices are used within the space 68, it is helpful to find a balance between the circulating velocity and the heat transfer needs, such that the compressible fluid does not heat too much because of the circulation.

Ultimately, the space 68 and its constituent parts may be designed to reach relatively high pressures, e.g., 750 psi. The ability to pump compressible fluid into the space 68 to a wide variety of operating pressures means that a wide variety of thermal conductivities are possible. In addition to fostering thermal conductivity, the ability to pump compressible fluid into the space 68 means that the pressure in the space 68 may be used to control the pressure of the gas stream that enters the cryogenic cell 26.

The gas stream enters the coils 70 through an input port 72, which would typically be a valved port. That valve may be electrically controllable in some embodiments. Once in the coils 70, heat is drained from the gas stream through the walls of the coils 70, with the inner vessel 50 receiving the heat from the gas stream and serving as a heat sink. Meanwhile, the stream is exposed to the pressure within the space 68. The conditions of temperature and pressure are chosen such that, preferably, at least one gas component of the stream condenses and liquefies while within the cryogenic cell 26. Once the desired liquefaction has occurred, the stream exits the coils 70 through an exit port 74. As might be appreciated from the above description, when the stream exits the cryogenic cell 26, it is typically a mixed gas/liquid stream.

In the illustrated embodiment, the double-walled construction of the inner vessel 50 and shroud 52 is not the only means of insulation. In this embodiment, a tubular outer shell 76, a top 78, and a bottom 80 protect the inner vessel 50 and shroud 52 and provide insulation. In this embodiment, the outer shell 76, top 78, and bottom 80 are polymeric in nature; that is, they are made of common plastics. Most common polymers have relatively low thermal conductivity, and many of them also have sufficient structural rigidity to protect the inner vessel 50 and shroud 52. Depending on the application and the need for thermal insulation, these components 76, 78, 80 may have wall thicknesses in the range of about 1-3 inches or more. The components 76, 78, 80 may be molded, extruded, machined from stock materials, or cast from liquid resin components, to name a few possibilities.

In this embodiment, the outer shell 76 is made from high density polyethylene (HDPE) and the top 78 and bottom 80 are made from ultra-high molecular weight (UHMW) polyethylene. Polyethylene is an advantageous material insofar as it is widely available. For example, in some cases, the outer shell 76 may be made of a recycled HDPE pipe, rather than a custom-fabricated piece of material. Dense polymer foams may also be used in some cases. If the outer shell 76 is out-of-round, it may be circumferentially clamped to maintain its shape and prevent ballooning under stress.

Certain adaptations are made to accommodate the greater flexibility of polymeric materials. For example, wide, annular load plates 82, 84 with many bolts are used to secure the top 78 and bottom 80 in order to distribute pressures evenly and widely.

When the system 10 is operating, there are several ways in which the temperature of the gas stream may be varied to an appropriate temperature. First, as was noted above, the space 68 between the inner vessel 50 and the shroud 52 has a mass of compressible fluid that can be varied in order to change the level of heat transfer. For example, an air compressor or vacuum pump in communication with the space 68 could be used to adjust the mass of compressible fluid in the space 68. In some embodiments, it may be desirable to increase the dwell time of the gas stream within the coils 70 in order to effect greater or lesser heat transfer. For example, as was noted briefly above, the gas stream could be held in the coils 70 for a few seconds or a few minutes, held in and let out by solenoid-actuated valves connected to the ports 72, 74. However, in order to effect continuous flow of material around the system 10, it may be useful to set the level of heat transfer within the space 68 such that the stream will achieve the necessary cold temperature with continuous flow through and out of the coils 70 at some defined flow rate. The volume of the inner vessel 50 may vary somewhat from embodiment to embodiment, but a volume sufficient to hold, e.g., 200 L of liquid nitrogen may be appropriate in many embodiments.

Once installed, the cryogenic cell 26 is intended to be a self-contained, closed system and may be at least relatively low maintenance. The inner vessel 50 containing the liquid nitrogen is pressure-sealed, heat transfer across the wall of the inner vessel 50 is regulated, and the cryogenic cell 26 is insulated to prevent unwanted heat loss by the outer shell 76, top 78, and bottom 80. The cold head 60 that maintains the liquid nitrogen in liquid form is self-contained, and may be, e.g., a Sumitomo CH-110 cold head. The cryogenic compressor 62 may be, for example, a Sumitomo Cryogenics F-70 compressor.

Thus, a cryogenic cell 26 allows for full control over the temperature and pressure to which the gas stream is exposed. By using valved input and output ports 72, 74, system 10 can also control how much material enters the coils 70 of the cryogenic cell 26 at any one time, and how long it dwells there. This allows for great flexibility in creating conditions that cause a component of the gas stream to liquefy. As was noted briefly above, cryogenic cells 40 in the second stage 14 of system 10 operate under the same principles and have the same basic structure, although modifications and changes may be made. For example, cryogenic cells 26, 40 in one stage 12, 14 may be larger or smaller than cryogenic cells 26, 40 in other stages: the volume of the inner vessel 50 may differ from one cell 26, 40 to the next, the volume of the coils 70 may vary, and the volume of the space 68 may vary. In some cases, a cryogenic cell 26, 40 may use a different first cryogen, depending on the temperatures necessary to liquefy the stream component that it is adapted to liquefy. The thicknesses of the inner vessel 50, the shroud 52, and the other components may also be increased to permit a cryogenic cell 26, 40 to operate at higher pressures, if needed.

In system 10, the first stage 12 may use, e.g., two cryogenic cells 26 in the first stage 12 and four cryogenic cells 40 in the second stage 14 for methane liquefaction. Each of the cells 26, 40 has an inner vessel 50 volume of 200 L of liquid nitrogen. These six cryogenic cells 26, 40 may be sufficient to treat, e.g., 250 million cubic feet of raw natural gas per day.

As the volume of gas to be treated increases, in some cases, storage tanks at the beginning and end of system 10 may be used. However, in many cases, it may be preferable simply to increase the number of cryogenic cells 26, 40 so as to increase throughput.

In the above description above, system 10 is described as having a first stage 12 and a second stage 14. However, this does not necessarily imply that the two stages 12, 14 will always be used sequentially, or that the second stage 14 is not being used while the first stage 12 is used. In a practical implementation of system 10, there may be several first stages 12 working in parallel with one another, feeding gas into several second stages 14, which are also arranged to work in parallel with one another. Additionally, as was noted above with respect to the first stage 12, the second stage 14 need not be empty in order for more gas to be added to it. In other implementations, a number of distinct stages, much like the first stage 12, may be configured to liquefy and remove certain specific components of the raw gas stream. That is, in some cases, there may be a specific stage, e.g., to remove a component like water vapor, instead of assuming that many unwanted gases will liquefy with carbon dioxide. The scalability and adaptability of system 10 are among its particular advantages.

In some cases, system 10 may be implemented in a fixed-location purification plant. However, the cryogenic cells 26, 40 are relatively small and portable, and in at least some embodiments, alternative arrangements can be considered.

Figure 3:
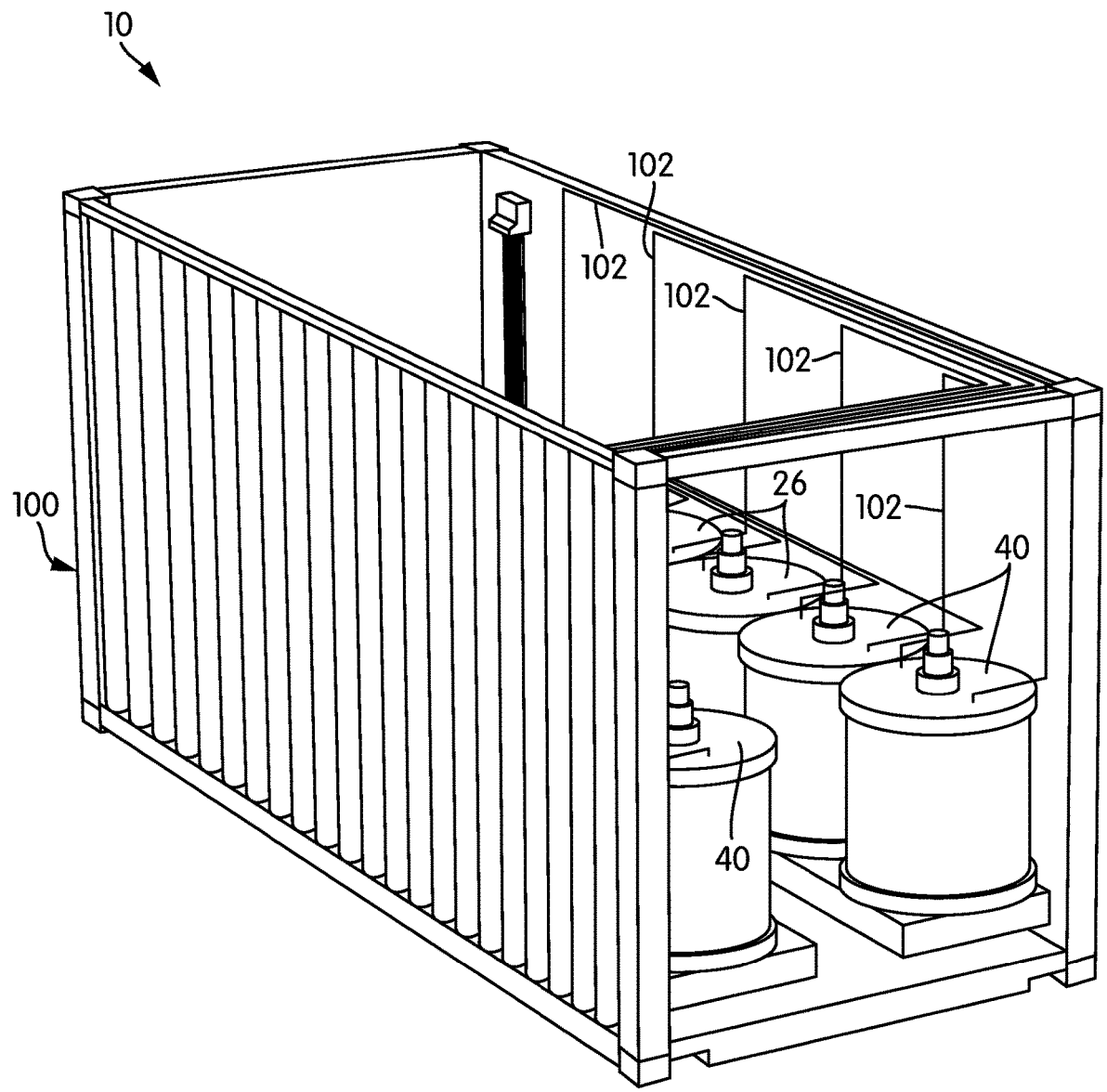
FIG. 3 is a perspective view of one possible implementation of the system of FIG. 1 in an intermodal transport container.

FIG. 3 is a perspective view illustrating one implementation of system 10. In the view of FIG. 3, several cryogenic cells 26, 40 sit within an intermodal transport container 100, e.g., a 20-foot intermodal transport container. Piping 102 connects the cryogenic cells 26, 40 as needed to create the general arrangement shown in FIG. 1.

The advantage of placing a working embodiment of system 10 in an intermodal transport container 100 is that the container 100 can be brought to a gas field and placed close to operating wells, thus reducing logistical and transport issues in handling the raw natural gas from the well or wells.

The focus of the above description is on producing useable natural gas from system 10; however, that need not be the case in all embodiments. In some cases, system 10 may focus on removing major contaminants, like carbon dioxide, nitrogen, and oxygen and placing the resulting stream in condition for easy transport. Nothing precludes other purification methods and techniques from being used on the output of system 10. In other words, system 10 may be a success, and may reduce or eliminate major challenges in handling raw natural gas streams close to their source, without producing absolutely pristine natural gas output. Although the output of system 10 may meet local requirements to be placed in a pipeline and sold to consumers for use, there is no absolute requirement that this be so.

System 10, and other systems according to embodiments of the invention, may also work in concert with other purification and separation apparatus. For example, while a system according to an embodiment of the invention would likely be able to remove a component like hydrogen sulfide, that does not mean that a system according to an embodiment of the invention would necessarily or always do so in a working embodiment. The toxicity of a contaminant, a low threshold for the contaminant in useable natural gas, and regulatory requirements are all factors that may weigh in favor of using a different separation apparatus for a particular contaminant or contaminants. Hydrogen sulfide is one example of a contaminant whose toxicity and the requirement of complete removal from a raw gas stream may weigh in favor of using another apparatus for removal. Thus, the term "raw natural gas" in this description should be read to include situations in which one or more contaminants are removed upstream of a system according to an embodiment of the invention. Moreover, a system according to embodiments of the invention may output a processed natural gas stream that includes methane as well as one or more contaminants, particularly if those contaminants are intended to be removed downstream by another apparatus.

Figure 4:
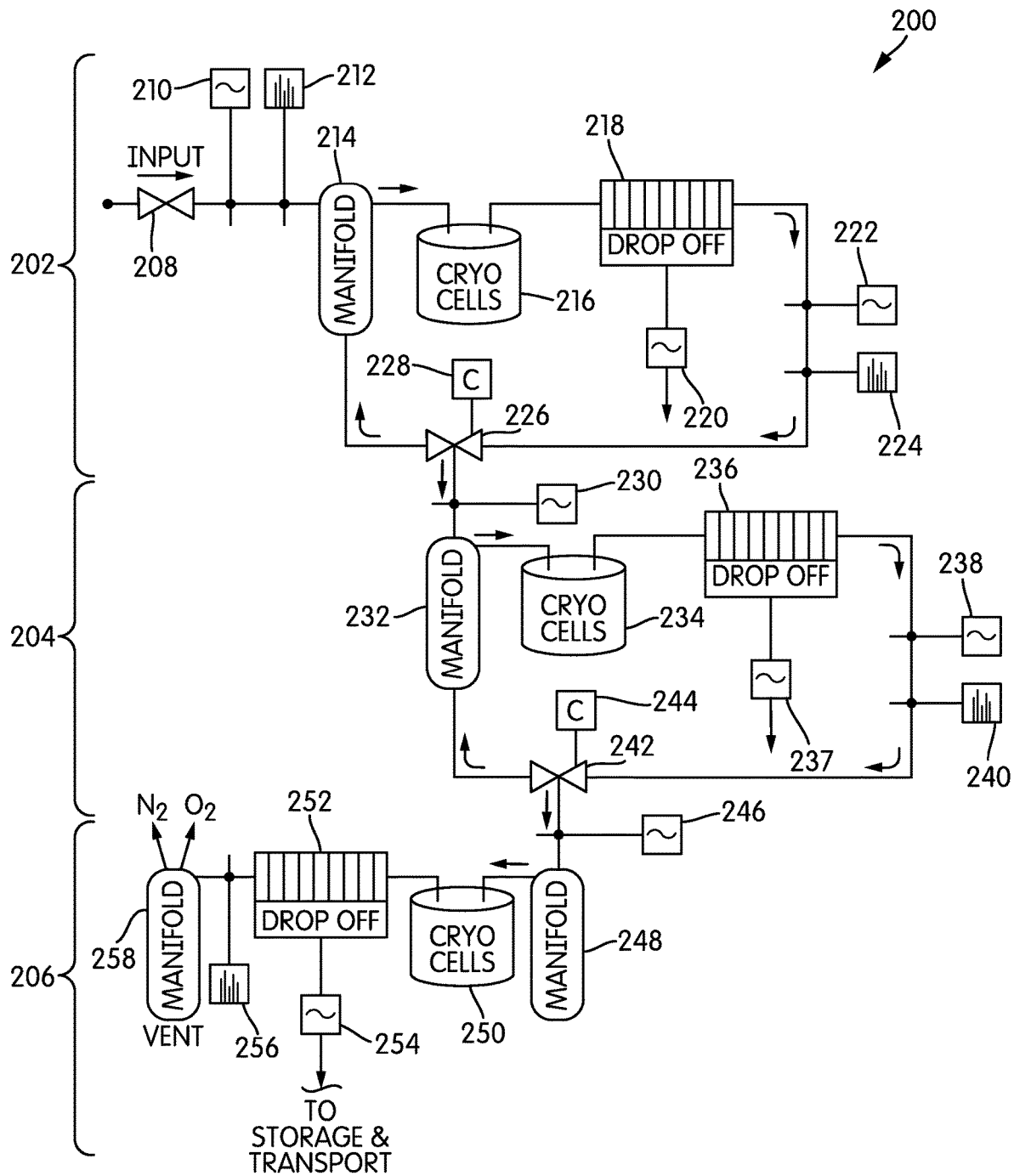
FIG. 4 is a schematic diagram of a three-stage gas separation and purification system according to another embodiment of the invention.

A system according to embodiments of the invention may also include more than two stages. FIG. 4 is a schematic diagram of a system, generally indicated at 200, that includes three stages 202, 204, 206. With three stages 202, 204, 206, the first stage 202 of system 200 is intended to liquefy and remove carbon dioxide, the second stage 204 is intended to liquefy and remove C2-C6 hydrocarbons, and the final stage 206 is intended to liquefy the remaining methane for transport and/or placement in a pipeline while venting any remaining nitrogen and oxygen. Of course, other types of contaminants may also be removed in each stage 202, 204, 206.

Specifically, the first stage 202 includes an input valve 208 that accepts the raw gas stream. Incoming raw gas is fed through a flow meter 210 and a component detector 212, like a mass spectrometer, before entering a manifold 214. From the manifold 214, the raw gas is fed into one or more cryogenic cells 216. The raw gas 214 may leave the manifold 214 continuously or in batches. As was described above, depending on the incoming volume of raw gas, the temperature of the raw gas, and other factors, any number of cryogenic cells 216 may be provided in the first stage 202. The raw gas may be fed into the cryogenic cells 216 continuously or in batches, with batch-processing used when it is necessary or desirable to increase the time during which the raw gas dwells within the space 68 of the cryogenic cells 216. In this embodiment, with the objective of liquefying carbon dioxide, the temperature in the interstitial space 68 of each cryogenic cell 216 in the first stage is about −100° F. (−73.3° C.) with 14 psi (96.5 kPa) of compressible fluid (e.g., nitrogen gas) in the space.

As with the first stage 12 of system 10 above, by the time the gas stream leaves the cryogenic cells 216 in the first stage 202 of system 200, it is assumed that at least some of the carbon dioxide has liquefied, such that the stream is a mixed gas/liquid stream. That stream flows from the cryogenic cells 216 to a drop off separator 218 that separates the liquefied components from the gas stream in order to exhaust them or store them. The output of the first stage drop off 218 is measured by a flow meter 220.

The remaining gas in the stream flows out of the drop off 218 and through a flowmeter 222 and a detector 224, presumably a spectrophotometer, before arriving at a three-way valve 226 that is controlled by a controller 228 coupled to at least the detector 224. As was described above, it is anticipated that it could require more than one pass through a cryogenic cell 216 before all of the undesired component or components are removed. Therefore, if the detector 224 indicates that the undesired component or components have been removed to within a predefined threshold, the controller 228 actuates the valve 226 to release the gas stream into the second stage 204. If the detector indicates that the undesired component or components remain in the gas stream above a predefined threshold, the valve 226 opens to the manifold 214 and the gas is recycled through the first stage 202.

Gas entering the second stage 204 is metered by a flowmeter 230 immediately after leaving the valve 226 and flows from there into the second-stage manifold 232. The overall layout of the second stage 204 is generally the same as the layout of the first stage 202, with the gas stream flowing into cryogenic cells 234, followed by a drop off separator 236. Liquefied components of the gas stream leave the second stage 204 through the drop off 236, and are metered by a flowmeter 237 as they do.

Because C2-C6 hydrocarbons have a number of uses, the compounds exiting system 200 through the second-stage drop off 236 may be sent to storage tanks for storage and eventual further processing.

The remaining gas is metered by a flowmeter 238, checked by a component detector 240, and comes to a second-stage three-way valve 242, where a controller 244 decides, based on input from the component detector 240, whether the gas should be released into the third stage 206 or recycled through the second stage 204 and actuates the valve 242 appropriately.

The difference between the second and third stages lies mainly in the cryogenic cells 234 and their arrangement. If the purpose of the second stage is to liquefy and remove C2-C6 hydrocarbons, there may be several cryogenic cells 234, more or fewer than the number of cryogenic cells 216 used in the first stage 202. For example, the cryogenic cells 234 may have a setpoint temperature and pressure within the interstitial space 86 of −60° F. (−51.1° F.) and 85 psi (586 kPa).

When the gas stream is released by the second-stage valve 242 into the third stage 206, it is again metered by a flowmeter 246 and flows into a manifold 248. At this point, the gas stream would typically comprise methane plus air-component gases like oxygen and nitrogen, which liquefy at much lower temperatures and at much higher pressures than carbon dioxide and hydrocarbons. This reduced-component gas stream is put through cryogenic cells 250 to liquefy the methane. As with the other stages 202, 204, the reduced-component gas stream may be fed into the cryogenic cells 250 in continuous fashion, or in batch fashion with a dwell time within the interstitial space 86 of the cryogenic cells 250.

Once the stream leaves the cryogenic cells 250, it is presumably a gas-liquid stream, with liquid methane entrained in a stream that also contains gases that have not been liquefied and separated, like nitrogen and oxygen. The stream is passed to a third-stage drop off separator 252. However, in this stage, rather than separating undesirable contaminants, it is actually the liquid methane that is separated out—the desired component of "pure" natural gas.

The methane may be metered by a flow meter 254 as it exits the drop off 252, after which it is sent to storage tanks and/or transport. In at least some cases, when the liquid methane exits the drop off 252, it may be ready for direct insertion into a pipeline for transport. In other cases, it may be stored on site, or placed in tanker trucks for transport. In some cases, if the nearest pipeline is far from the natural gas field, the liquefied methane may be transported by tanker truck to the nearest pipeline. However, as was noted above with respect to system 10, while system 200 may produce pure methane suitable for immediate transportation and use, it need not always do so.

After the third-stage drop off 252, the remaining gases may be checked by a component detector 256, which may be a mass spectrometer. That said, in the later stages of system 200, it may be sufficient to use a component detector that is specific to a single unwanted contaminant or a particular type of unwanted contaminants, as the number of unique contaminants in the gas stream has presumably been winnowed by this point. Thus, the component detector 256 may be of the same type as the component detectors 212, 224, 240 used in earlier stages but configured differently, or it may be of a different type entirely.

The remaining gases flow into a manifold 258 that includes a vent stack. The manifold and vent stack 258 allows gases that are safe for release into the atmosphere, like nitrogen and oxygen, to be released into the atmosphere. Alternatively, these gases may be retained and routed to storage. If, for some reason, a gas stream has a contaminant that is not removed in any of the stages 202, 204, 206 (or the combination of them), the stream may be retained in storage or routed to other systems for further purification. As was noted above, nothing precludes the use of other purification and separation methods in combination with systems like system 200.

In FIG. 4, the third stage 206 is shown as linear; that is, the gas stream is not recycled back to the cryogenic cells 250 after the third stage drop off 252. However, if it is necessary or desirable to do so, the third stage 206 could be arranged like the first stage 202 and the second stage 204 to recycle the gas stream through the cryogenic cells 250 until all, or substantially all, of the methane has been removed from the stream.

Although system 200 has more stages and uses more cryogenic cells 216, 234, 250 to do its work, it would generally still be small enough to be placed in an intermodal transport container and moved on-site, close to the field where the natural gas is being produced. In practice, system 200 may look just as system 10 does in FIG. 3.

The systems 10, 200 described here are different from one another because the raw gas streams that they are intended to purify are different. To a large extent, the characteristics of systems according to embodiments of the invention will depend on the raw gas stream on which the system is to operate, its particular composition, and the volume of raw natural gas that is to be treated per unit of time. The system characteristics that may vary include, but are not limited to, the number of stages in the system, the number of cryogenic cells in each stage, and the temperature and pressure setpoints of those cryogenic cells.

As examples, Table 1 below contains a portion of the "gas cards" (i.e., a portion of the compositional assays) for two different sources of raw natural gas, denoted Stream A and Stream B in the table.

TABLE 1

Compositional assays for two different raw natural gas streams.

|  | Stream A (mol %) | Stream B (mol %) |
| --- | --- | --- |
| Nitrogen | 1.8618 | 13.4504 |
| Oxygen | 0.4522 | (Not Reported) |
| Carbon Dioxide | 37.7198 | 0.0870 |
| Methane | 59.9484 | 71.0601 |

TABLE 1-continued

Compositional assays for two different raw natural gas streams.

|  | Stream A (mol %) | Stream B (mol %) |
| --- | --- | --- |
| Ethane | (Not Reported) | 9.7171 |
| Propane | 0.0038 | 3.3457 |
| Isobutane | 0.0009 | 0.3832 |
| n-Butane | 0.0011 | 1.2003 |
| Isopentane | 0.0008 | 0.2577 |
| n-Pentane | 0.0004 | 0.1356 |
| Hexane and higher | 0.0086 | 0.1356 |

The precise system characteristics of a system used to treat each of these natural gas streams will depend, in part, on the volume that is to be treated per unit time. That is, for both streams, it may be advantageous to use a system much like system 200, with a first stage 202 for carbon dioxide removal, a second stage 204 for hydrocarbon removal, and a third stage 206 for methane liquefaction and removal, as well as the venting or storage of atmospheric gases. If the volume of raw natural gas per unit of time is relatively low, a single cryogenic cell 216, 234, 250 in each stage 202, 204, 206 may be sufficient (increasing the volume of the space 86 in each cell is always an option), and in some cases, that cell 216, 234, 250 may operate in batch mode, with the gas dwelling in the cell 216, 234, 250 for some period of time in each stage.

However, perhaps most frequently, additional cryogenic cells 216, 234, 250 will be added in proportion to the amount or mole percent of each contaminant in the stream, allowing the resulting system to handle the raw gas stream at its full volume substantially in real time. Given Table 1, for example, a system constructed for Stream A will likely need more cryogenic cells 216 in the first stage 202 to deal with the large mole percentage of carbon dioxide than a system constructed for Stream B. Conversely, a system built to handle Stream B will likely require more cryogenic cells 234 in the second stage to deal with the higher mole percentage of hydrocarbons in that stream.

Given that cryogenic cells 26, 40, 216, 234, 250 are modular components, it is relatively easy to add cryogenic cells 26, 40, 216, 234, 250 as needed, and to re-allocate cryogenic cells 26, 40, 216, 234, 250 among stages, if needed.

Systems 10, 200 according to embodiments of the invention rely on temperature- and pressure-induced phase changes to effect separation of one component of a raw gas stream from the other components. Much of this description presumes that the phase change in question will be a phase change from gas phase to liquid phase. In some cases, however, a component or components may change to solid phase. This may be possible if the solid-phase contaminant remains, e.g., in the form of small particles that can be entrained in the gas stream. However, temperature and pressure setpoints should generally be controlled to prevent materials from freezing solid and creating blockages within the spaces 86 of the cryogenic cells 26, 40, 216, 234, 250.

While the invention has been described with respect to certain embodiments, the description is intended to be exemplary, rather than limiting. Modifications and changes may be made within the scope of the invention, which is defined by the appended claims.

What is claimed is:

1. A gas purification apparatus, comprising:
    a cryogenic cell including
        an inlet,
        a first vessel containing a first cryogen, the first vessel maintaining the first cryogen in a cryogenic condition,
        a space in selective, partial thermal communication with the first vessel, the space being at least substantially airtight and adapted to be filled or evacuated with a compressible fluid that (1) increases or decreases thermal communication with the first vessel in accordance with a pressure of the compressible fluid within the space, and (2) places contents of the space under the pressure of the compressible fluid, the cryogenic cell having a temperature setpoint and a pressure setpoint that are related to the pressure of the compressible fluid within the space,
        a conduit to circulate a gas stream connected to the inlet, at least a portion of the conduit lying within the space such that the conduit does not make physical contact with the first vessel, the space adapted to cause or allow a mixed-phase stream to form within the conduit and an outlet connected to the conduit; and
    a separator connected to the outlet of the cryogenic cell, the separator adapted to separate phase-changed components from a mixed-phase stream emerging from the cryogenic cell.

2. The apparatus of claim 1, wherein the first vessel further includes a cold head, the cold head containing a second cryogen that is colder than the first cryogen, the cold head maintaining the first cryogen in a cryogenic condition.

3. The apparatus of claim 1, wherein the cryogenic cell and the separator comprise a first stage of the gas purification apparatus.

4. The apparatus of claim 3, wherein the first stage of the gas purification apparatus further comprises:
    a valve coupled to the separator;
    a manifold coupled between the valve and the cryogenic cell; and
    a component detector arranged between the separator and the valve;
    wherein the valve is adapted to direct a gas stream emerging from the separator either to the manifold or out of the first stage.

5. The apparatus of claim 4, further comprising a component detector between the separator and the valve.

6. The apparatus of claim 5, wherein the valve is controlled in accordance with measurements made by the component detector.

7. The apparatus of claim 6, further comprising a second stage including:
    a second cryogenic cell with a second temperature setpoint and a second pressure setpoint different from the temperature setpoint and the pressure setpoint of the cryogenic cell of the first stage.

8. The apparatus of claim 7, the second stage further including a vent allowing atmospheric gases to be exhausted to atmosphere.

9. The apparatus of claim 7, the second stage further including a second separator connected to an outlet of the second cryogenic cell.

10. The apparatus of claim 9, the second stage further including:
    a second valve coupled to the second separator;
    a second manifold coupled between the second valve and the second cryogenic cell; and
    a second component detector arranged between the separator and the valve;
    wherein the second valve is adapted to direct a gas stream emerging from the second separator either to the second manifold or out of the second stage.

11. The apparatus of claim 1, wherein:
    the first vessel of the cryogenic cell is generally cylindrical;
    the space is defined between a generally cylindrical shroud placed around and at a distance from the first vessel and the first vessel itself; and
    the conduit comprises a set of coils that traverse around the inner vessel within the space without making physical contact with the first vessel.

12. The apparatus of claim 11, further comprising one or more insulating layers around the space.

13. The apparatus of claim 1, wherein the compressible fluid comprises a gas.

14. The apparatus of claim 13, wherein the compressible fluid comprises nitrogen gas.

15. A method, comprising:
    providing a cryogenic cell including
        an inlet,
        a first vessel containing a first cryogen, the first vessel maintaining the first cryogen in a cryogenic condition,
        a space in selective, partial thermal communication with the first vessel, the space being at least substantially airtight and adapted to be filled or evacuated with a compressible fluid that (1) increases or decreases thermal communication with the first vessel in accordance with a pressure of the compressible fluid within the space, and (2) places contents of the space under the pressure of the compressible fluid, the cryogenic cell having a temperature setpoint and a pressure setpoint that are related to the pressure of the compressible fluid within the space,
        a conduit connected to the inlet, at least a portion of the conduit lying within the space such that the conduit does not make physical contact with the first vessel, and
        an outlet connected to the conduit;
    circulating a gas stream through the conduit of the cryogenic cell with the temperature setpoint and the pressure setpoint of the cryogenic cell set such that at least one component of the gas stream will undergo a phase change, creating a mixed-phase gas stream; and
    separating the phase-changed component from the mixed-phase gas stream to create a component-stripped gas stream.

16. The method of claim 15, further comprising detecting one or more components of the component-stripped gas stream and returning the component-stripped gas stream to the conduit of the cryogenic cell while an amount of the at least one component is greater than a predefined threshold.

17. The method of claim 15, further comprising circulating the component-stripped gas stream through a second cryogenic cell with a second temperature setpoint and a second pressure setpoint that are different from the temperature setpoint and the pressure setpoint of the first cryogenic cell.

18. The method of claim 17, wherein
the component-stripped gas stream contains methane; and
the second temperature setpoint and the second pressure setpoint are such that methane will liquefy out of the component-stripped gas stream.

19. The method of claim 17, wherein the second temperature setpoint and the second pressure setpoint are such that a second component will undergo a phase change.

20. The method of claim 19, further comprising separating the phase-changed second component from the contaminant-stripped gas stream.

21. The method of claim 15, wherein the gas stream comprises a raw natural gas stream and the at least one component of the gas stream comprises at least one contaminant.

22. An apparatus comprising:
a first stage, including
a first-stage input adapted to accept a raw gas stream,
a first-stage manifold connected to the first-stage input,
a first-stage cryogenic cell adapted to place the raw gas stream under defined temperature and pressure conditions so as to cause a component of the raw gas stream to change phase, creating a mixed stream,
a first-stage separator adapted to accept the mixed stream containing gas and the phase-changed component and to separate the phase-changed component from the mixed stream, creating a component-stripped gas stream,
a first-stage component detector adapted to measure a quantity of the component in the component-stripped gas stream,
a first-stage, multi-way valve coupled to at least (1) an output of the first stage separator, (2) the first-stage manifold, and (3) a second-stage input, and
a controller that controls the first-stage multi-way valve in accordance with the measured quantity of the component in the component-stripped gas stream, such that the first-stage, multi-way valve is opened to the first-stage manifold when the measured quantity of the component in the component-stripped gas stream is greater than a predefined threshold and the first-stage, multi-way valve is opened to the second-stage input when the measured quantity of the component in the component-stripped gas stream is less than a predefined threshold; and
a second stage, including
a second-stage cryogenic cell in fluid communication with the second-stage input and adapted to place the component-stripped gas stream under second defined temperature and pressure conditions so as to cause a second component of the component-stripped gas stream to change phase, creating a second mixed stream, the second defined temperature and pressure conditions being different from the defined temperature and pressure conditions of the first-stage cryogenic cell, and
a second-stage separator adapted to accept the second mixed stream containing gas and the phase-changed second component and to separate the phase-changed second component from the second mixed stream, creating a second component-stripped gas stream.

23. The apparatus of claim 22, further comprising:
a second-stage manifold connected to the second-stage input;
a second-stage component detector adapted to measure a quantity of the second component in the second component-stripped gas stream;
a second-stage, multi-way valve coupled to at least (1) an output of the second-stage separator, (2) the second-stage manifold, and (3) an output; and
a second controller that controls the second-stage multi-way valve in accordance with the measured quantity of the second component in the second component-stripped gas stream, such that the second-stage, multi-way valve is opened to the second-stage manifold when the measured quantity of the component in the second component-stripped gas stream is greater than a predefined threshold and the second-stage, multi-way valve is opened to the output when the measured quantity of the second component in the second component-stripped gas stream is less than a predefined threshold.

24. The apparatus of claim 23, wherein the output comprises a third-stage input.

25. The apparatus of claim 22, wherein the first-stage cryogenic cell and the second-stage cryogenic cell each comprise:
an inlet;
a first vessel containing a first cryogen, the first vessel maintaining the first cryogen in a cryogenic condition;
a space in selective, partial thermal communication with the first vessel, the space being at least substantially airtight and adapted to be filled or evacuated with a compressible fluid that (1) increases or decreases thermal communication with the first vessel in accordance with a pressure of the compressible fluid within the space, and (2) places contents of the space under the pressure of the compressible fluid, the cryogenic cell having a temperature setpoint and a pressure setpoint that are related to the pressure of the compressible fluid within the space;
a conduit connected to the inlet, at least a portion of the conduit lying within the space such that the conduit does not make physical contact with the first vessel; and
an outlet connected to the conduit.

* * * * *